Aug. 5, 1924.
J. DUMONT
1,503,784
MACHINE FOR PRODUCING RATTAN WEAVING STRIPS
Filed April 8, 1922
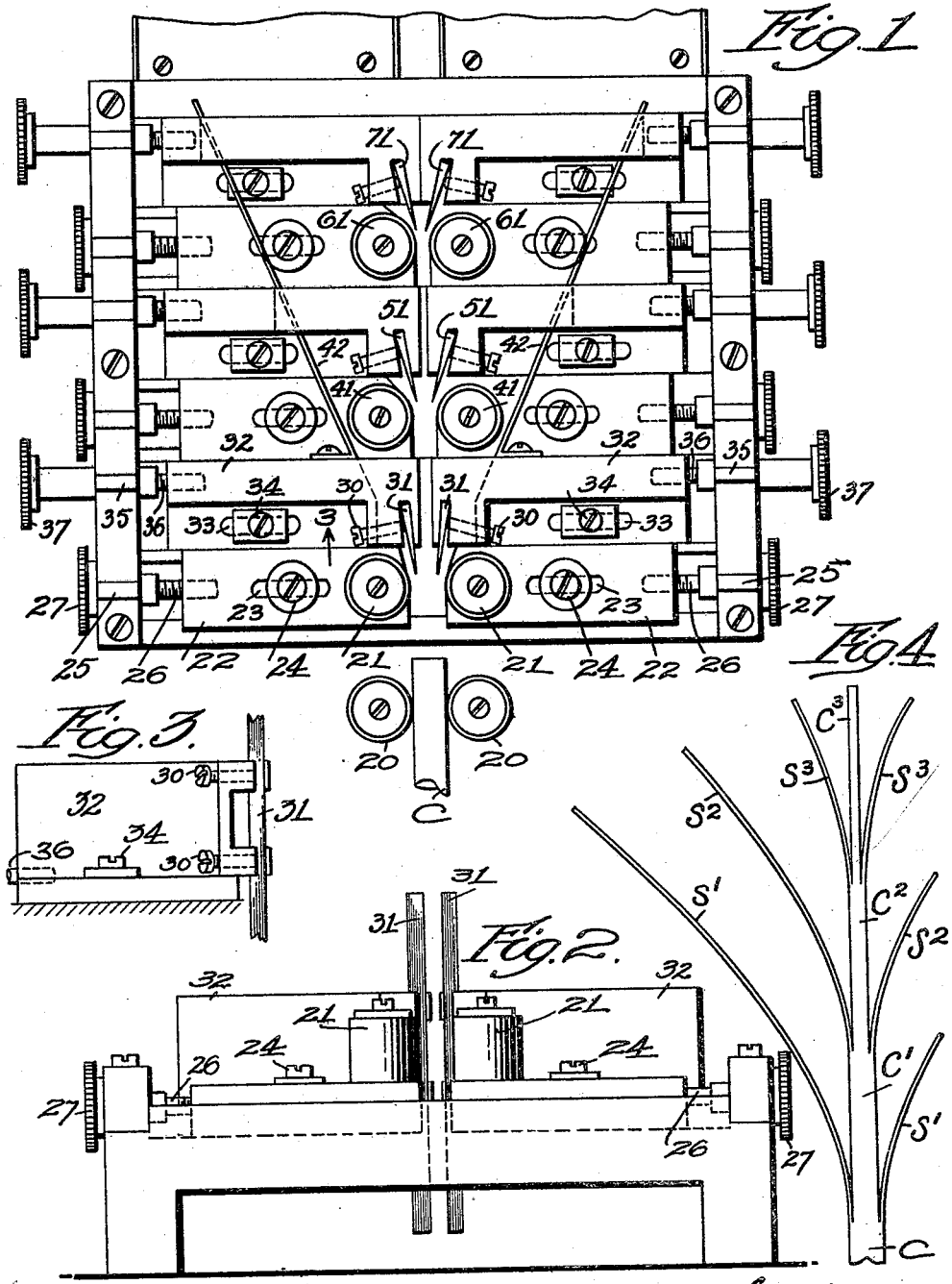

Patented Aug. 5, 1924.

1,503,784

UNITED STATES PATENT OFFICE.

JOSEPH DUMONT, OF GARDNER, MASSACHUSETTS, ASSIGNOR TO COMMONWEALTH MANUFACTURING COMPANY, OF GARDNER, MASSACHUSETTS, A CORPORATION OF MASSACHUSETTS.

MACHINE FOR PRODUCING RATTAN WEAVING STRIPS.

Application filed April 8, 1922. Serial No. 550,930.

*To all whom it may concern:*

Be it known that I, JOSEPH DUMONT, a citizen of the United States, residing at Gardner, in the county of Worcester and State of Massachusetts, have invented a new and useful Machine for Producing Rattan Weaving Strips, of which the following is a specification.

This invention relates to a method of and machine for dividing reeds of rattan into a number of reeds, each having two opposite flat surfaces with square edges.

The principal object of the invention is to provide a simple and practical way of accomplishing the above result. The invention also involves the provision of means for mounting the splitting knives so as to permit of this action; means for adjusting the knives; and also means for adjusting the guiding rollers and other features as will appear.

Reference is to be had to the accompanying drawings, in which

Fig. 1 is a plan of a splitting machine constructed in accordance with this invention;

Fig. 2 is a front elevation;

Fig. 3 is a side view showing means for supporting one of the knives;

Fig. 4 is a plan of a piece of square reed showing the way it is split up by the machine, and Fig. 5 is an enlarged end view of a piece of round reed shown stripped and then split as it comes out of this machine, but with the parts all brought together in contact.

It has been customary heretofore to produce round or cylindrical reeds from the raw rattan by scraping off the exterior surfaces. These are then cut up in different ways to make weaving strips or the like, usually producing reeds that are concave on one side and convex on the other, also the core is left cylindrical.

The operation has been to strip the weaving reeds from the surfaces of the reed. I find that it is much more economical and avoids practically all the waste if the ordinary cylindrical reed R, after being scraped to cylindrical form, is immediately cut to a square shape, as shown in Fig. 5, by removing four weaving strips S from its sides, each at right angles to the next one. These strips are convex on one side and flat on the other and are preferably formed originally with square edges so that they can be used as weaving strips somewhat thicker than the ordinary ones above mentioned. Then the square core C is treated by the machine described below to produce a plurality of flat weaving strips as shown in Fig. 5, each one having square edges and not having to be trimmed in any way. This saves waste and certain edge trimming operations that have been necessitated before.

The machine is shown as provided with a pair of guiding rollers 20 between which the core C, having a square cross section, is introduced into the machine. Located in line with the spaces between these rollers are a pair of equally spaced rollers 21 which are mounted on two slides 22. Each of these slides is provided with a slot 23 through which passes a screw 24 having a washer on it.

The sides of the machine are provided with bearings for studs 25 having screws 26, one of them fitting into screw-threaded openings in the ends of these slides for adjusting the rollers 21 toward and from each other. A hand wheel 27 is located on each stud 25 for operating it.

Just behind the slides 22 are another pair of slides 32 each having a slot 33 and screw 34 for guiding it and provided with stud 35, screw 36 and hand wheel 37 like the corresponding parts referred to in reference to the slide 22. On these slides 32 are arranged splitting blades 31 held in position by screws 30 against solid parts of the slide, each slide being provided with a slot for receiving its blade. Two of these slides are located opposite each other just back of the slides 22 and therefore the blades 31 are located just back of the rollers 21. In this way the reed can pass between the rollers which hold it on opposite sides and it is immediately split to form two weaving strips S', equal in width and uniform in cross section and having square edges when first produced so that they require no trimming. These strips pass out on the outer sides of the blades 31.

The core C' of the reed left by these knives passes in through the machine until it comes to a second pair of rollers 41 and a second pair of blades 51. These are supported and controlled in the same way as those above described, and they act on the core C to produce two weaving strips $S^2$. The core $C^2$ between these two blades passing on is compressed between another pair of rollers 61 and split again by a pair of knives 71 supported in the same way as the other rolls and knives to produce another pair of weaving strips $S^3$, and a thinner core $C^3$. This thinner core is usually grasped by another pair of rollers not shown, to pull the whole reed through the machine. A pair of guides 42 is shown for keeping all the weaving strips inside and insuring their delivery in the proper manner.

In this way it will be seen that the original core C of square cross section is split up by this machine into six or any other even number of square edged flat weaving strips and that a core $C^3$ is left having flat sides and square edges to be used for certain purposes for which it is fitted. The machine can be adjusted to regulate the thickness of the strips and any number of pairs of cutters other than those shown can be used at a time. The reed preferably is forced through the machine by supplying power to the rollers 20 and to the rollers at the other end of the machine grasping the final core.

Although I have illustrated and described only a single form of the invention I am aware of the fact that modifications can be made therein by any person skilled in the art without departing from the scope of the invention as expressed in the claim. Therefore, I do not wish to be limited to all the details of construction herein shown and described, but what I do claim is:—

In a machine for splitting rattan, the combination with a frame, of a series of pairs of parallel slides on said frame, those of each pair being adjustable toward and from each other independently, a roller on each slide for engaging the opposite sides of a square reed, a corresponding series of pairs of splitting knives located with their cutting edges between each pair of rollers and spaced but parallel to diverging tangents from said rollers for splitting the reed as it passes through the rollers, means for adjusting each splitting knife independently, and means for adjusting each slide toward and from the other slide of the pair.

In testimony whereof I have hereunto affixed my signature.

JOSEPH DUMONT.